United States Patent [19]

Briggs et al.

[11] 4,395,501

[45] Jul. 26, 1983

[54] POLYMER-CARBON BLACK MIXING

[75] Inventors: George J. Briggs; Yung-Kang Wei, both of Sarnia, Canada

[73] Assignee: Polysar Limited, Sarnia, Canada

[21] Appl. No.: 289,993

[22] Filed: Aug. 4, 1981

[30] Foreign Application Priority Data

Oct. 31, 1980 [CA] Canada ................... 363667

[51] Int. Cl.³ ............................... C08K 3/04
[52] U.S. Cl. .................... 523/351; 524/526; 525/236; 525/237
[58] Field of Search ............... 260/5, 33.6 AQ, 42.56; 525/236, 237; 523/351; 524/526

[56] References Cited

U.S. PATENT DOCUMENTS

| | | | |
|---|---|---|---|
| 3,108,983 | 10/1963 | Barclay | 260/33.6 AQ |
| 3,872,036 | 3/1975 | Todani et al. | 523/351 |
| 3,976,608 | 8/1976 | Buckler et al. | 260/42.56 |
| 4,005,053 | 1/1977 | Briggs et al. | 260/33.6 AQ |
| 4,116,909 | 9/1978 | Muller | 523/351 |
| 4,215,021 | 7/1980 | Ogawa et al. | 260/42.56 |
| 4,222,906 | 9/1980 | Briggs | 260/42.56 |
| 4,259,218 | 3/1981 | Haws | 525/236 |
| 4,321,168 | 3/1982 | Veda et al. | 524/526 |

Primary Examiner—John C. Bleutge
Assistant Examiner—Herbert J. Lilling
Attorney, Agent, or Firm—Stevens, Davis, Miller & Mosher

[57] ABSTRACT

A process is provided for the production of vulcanizates having improved properties wherein polymer (or polymers) is mixed with carbon black in two separate steps such that in one step a major proportion of the carbon black to be used is mixed with polymer and in a second step a zero to minor proportion of the carbon black to be used is mixed with polymer. Such improved vulcanizates may be used, for example, in tires or a variety of mechanical goods.

16 Claims, No Drawings

POLYMER-CARBON BLACK MIXING

This invention is directed to a process for producing vulcanizates having improved properties wherein the mixing of the carbon black with the polymer is undertaken in two separate steps.

The art of producing vulcanizates having a wide range of properties is well known. A polymer, synthetic or natural, is mixed with one or more fillers and then with cure active agents and the compound so produced is then shaped and vulcanized by heating. Suitable fillers are extensive in number and include one or more of the various grades of carbon black and the various inorganic materials well known in the art.

It is also well known in the art that control is necessary of many of the steps throughout the compounding process in order to obtain the desired vulcanizate properties. For example, if the filler is not well dispersed in the polymer, it is not possible to obtain good vulcanizate properties or if the temperature at any one or more of the steps in the compounding process is allowed to reach too high a value good vulcanizate properties will not be achieved. Illustrative of the many books that have been written on the subject are Vulcanization of Elastomers by G. Alliger and I. J. Sjothun, Reinhold Publishing Corp., N.Y., 1964, Vulcanization and Vulcanizing Agents by Werner Hofmann, Palmerton Publishing Co. Inc., N.Y., 1967 and Rubber Technology and Manufacture, edited by C. M. Blow, The Chemical Rubber Company, Cleveland 1971.

We have now discovered a process for producing vulcanizates having improved properties wherein the carbon black is mixed with the polymer in two separate steps.

It is an objective of our invention to provide a process for the production of vulcanizates having improved properties.

According to our invention, there is provided a process for producing a vulcanizate having improved properties, said process comprising the steps of:
  (a) mixing two or more $C_4$ or $C_5$ conjugated diolefin containing polymers with carbon black and other compounding ingredients except cure active agents, followed by resting of the compound so produced,
  (b) mixing the compound from (a) with other compounding ingredients including sulphur and sulphur-containing or peroxidic cure active agents,
  (c) shaping the mixture from (b), and
  (d) vulcanizing the shaped mixture by heating at a temperature of from about 145° to about 225° C. for a time of from about 3 to about 60 minutes, characterized in that in step (a), the polymers are mixed in at least two separate steps wherein:
  (i) about 33 to about 60 weight percent of one or more of the polymers is mixed with from about 60 to 100 weight percent of the carbon black, said polymers being selected from $C_4$ or $C_5$ conjugated diolefin containing synthetic polymers,
  (ii) about 67 to about 40 weight percent of one or more of the polymers is mixed with from 0 to about 40 weight percent of the carbon black, said polymers being selected from $C_4$ or $C_5$ conjugated diolefin containing synthetic polymers and natural rubber, such mixing of polymers and carbon black being in a single mix or in separate mixes containing only a single polymer, and
  (iii) the compounds from (i) and (ii) are supplied to step (b).

Also in accordance with our invention, there is provided a process for producing a vulcanizate having improved properties, said process comprising the steps of:
  (a) mixing one or two $C_4$ to $C_5$ conjugated diolefin containing polymers with carbon black and other compounding ingredients except cure active agents, followed by resting of the compound so produced,
  (b) mixing the compound from (a) with other compounding ingredients including sulphur and sulphur-containing or peroxidic cure active agents,
  (c) shaping the mixture from (b), and
  (d) vulcanizing the shaped mixture by heating at a temperature of from about 145° to about 225° C. for a time of from about 3 to about 60 minutes, characterized in that in step (a), the polymer or polymers are mixed in two separate steps wherein:
  (i) about 40 to about 60 weight percent of the polymer or polymers selected from $C_4$ or $C_5$ conjugated diolefin containing synthetic polymers is mixed with from about 60 to 100 weight percent of the carbon black,
  (ii) about 60 to about 40 weight percent of the polymer or polymers selected from $C_4$ or $C_5$ conjugated diolefin containing synthetic polymers and natural rubbers is mixed with from 0 to about 40 weight percent of the carbon black, and
  (iii) the compounds from (i) and (ii) are supplied to step (b).

As is apparent, an essential feature of the present invention is that in one step a major proportion of the carbon black to be used is mixed with a certain proportion of one or more of the rubbers and in a separate step a zero to minor proportion of the carbon black to be used is mixed with the remaining proportion of the one or more of the rubbers, the two, or more, compounds so produced than being mixed together at the step at which the cure active agents are incorporated. We have no explanation of why such a process should lead to the production of vulcanizates having improved properties.

Polymers that may be used within the scope of our invention are $C_4$ or $C_5$ conjugated diolefin containing polymers, which include the $C_4$ or $C_5$ conjugated diolefin containing synthetic polymers such as polybutadiene, polyisoprene, and styrene-butadiene polymers and includes natural rubber which of course is a polyisoprene. Such rubbery polymers are well known in the art. The polybutadiene may contain from about 30 to about 98% cis-1,4 structure, the polyisoprene may contain above about 90% cis-1,4 structure and the styrene-butadiene polymer may contain from about 15 to about 40 weight percent of styrene. In one aspect of the invention, a single polymer, e.g. polybutadiene or butadiene-styrene polymer, but not natural rubber, may be used for mixing with a major proportion of the carbon black. In another aspect of the invention, two polymers, e.g. polybutadiene, butadiene-styrene polymer, or natural rubber, may be used in which either one of or portions of both of the synthetic polymers (that is, for example, the polybutadiene or the styrene-butadiene polymer) may be used for mixing with the major proportion of the carbon black. In yet another aspect of the invention, three polymers, e.g. polybutadiene, butadiene-styrene polymer and natural rubber, may be used in which the natural rubber may only be mixed with a minor proportion of the carbon black.

In preferred embodiments of the invention, a styrene-butadiene polymer and a styrene-butadiene polymer-oil-carbon black masterbatch are used with the styrene-butadiene polymer being mixed with a zero to minor proportion of the carbon black, a styrene-butadiene polymer and an oil-extended styrene-butadiene polymer are used with the styrene-butadiene polymer being mixed with a zero to minor proportion of the carbon black, a styrene-butadiene polymer and a polybutadiene are used with either polymer being mixed with a zero to minor proportion of the carbon black, a styrene-butadiene polymer and natural rubber are used with the natural rubber being mixed with a zero to minor proportion of the carbon black, and a styrene-butadiene polymer, polybutadiene and natural rubbers are used with the natural rubber being mixed with a zero to minor proportion of the carbon black. Where natural rubber is used it is also contemplated that the natural rubber may be partially or completely replaced by a green strength styrene-butadiene polymer prepared according to either of Canadian Pat. Nos. 1,014,296 or 1,061,048.

The carbon blacks that may be used in this invention are those well known in the industry and which act as reinforcing agents. Following the designations given in ASTM D 1765, those blacks which may be used include but are not limited to N 110, N 220, N 330, N 550, N 660 and N 765 and mixtures thereof.

Other compounding ingredients except cure active agents that may be used in the present invention include other fillers such as clay, whiting and silica, rubber reclaim, oils, plasticizers, waxes, antioxidants and/or antiozonants, tackifiers, bonding agents, zinc oxide and stearic acid.

Cure active agents that may be used in the invention and mixed in step (b) with the compound from step (a) include sulphur, various sulphur-containing compounds known in the art as accelerators or ultra-accelerators and organic peroxidic compounds known in the art as curatives. The sulphur may be as the pure elementary material or as a dispersion in oil. Examples of sulphur-containing compounds known as accelerators include the thiazoles, benzothiazoles, thiuram sulphides and disulphides, sulphenamides, mercaptobenzothiazole and dithiocarbamates. Examples of organic peroxidic compounds known as curatives include dicumyl peroxide, benzoyl peroxide and lauryl peroxide.

The mixing may be as in the preparation of a polymer-carbon black or a polymer-oil-carbon black masterbatch or as in conventional rubber mixing or compound equipment. The preparation of polymer-carbon black or polymer-oil-carbon black masterbatches is well known in the industry—the polymer, usually in the form of an emulsion in water, the oil when used and the carbon black as a slurry in water are fed to a coagulation vessel where they contact a coagulation agent under controlled conditions of mixing to yield the masterbatch which is recovered in the well known manner. When such a masterbatch is used, further carbon black may be added for mixing with the masterbatch or with the other polymer(s). Such a masterbatch may be used as the compound of step (i) hereinbefore defined with or without mixing with other compounding ingredients and may be supplied together with a suitable compound from step (ii) to step (b). When such a masterbatch is used it preferably contains a styrene-butadiene polymer, and from about 30 to about 150 parts, preferably from about 40 to about 80 parts, by weight per 100 parts by weight of polymer of carbon black and from 0 up to about 100 parts, preferably from about 25 to about 50 parts, by weight per 100 parts by weight of polymer of oil.

The polymer and carbon black may also be mixed in conventional rubber mixing equipment such as on a rubber mill or in an internal mixer, in which case the total carbon black to be used may be from about 30 to about 80 parts by weight per 100 parts by weight of polymer and from about 60 to 100 weight percent of the carbon black to be used is mixed with from about 33 to about 60 weight percent of the polymer when two or three polymers are used or from about 60 to 100 weight percent of the carbon black to be used is mixed with from about 40 to about 60 weight percent of the polymer when one or two polymers are used. Preferably, for both of when two or three polymers or when one or two polymers are used, from about 75 to 100 weight percent of the carbon black to be used is mixed in step (i) with the polymer(s) when the carbon black to be used is from about 30 to about 50 parts by weight per 100 parts by weight of polymer(s) and from about 60 to about 75 weight percent of the carbon black to be used is mixed in step (i) with the polymer(s) when the carbon black to be used is from about 50 to about 80 parts by weight per 100 parts by weight of polymer(s). Such mixing may generally be for times of from about 2 in about 10 minutes, preferably from about 2 to about 5 minutes, with the initial temperature of the mill or internal mixer generally being from about 60° to about 110° C. and the final temperature generally being from about 125° to about 170° C. The other compounding ingredients except cure active agents which may also be mixed with the polymer and carbon black may be introduced into step (i) and/or step (ii) or partly into both of step (i) and step (ii). Preferably, oil, plasticizer, tackifier, antioxidant, zinc oxide, stearic acid and bonding agent or parts thereof will be mixed with the polymer and carbon black in either step (i) and/or step (ii). For the step (b) mixing, which may be on a rubber mill or in an internal mixer, the temperature at the start of mixing will generally be from about 30° to about 60° C. and the final temperature will generally be from about 80° to about 110° C., the mixing time generally being from about 1 to about 10, preferably from about 1 to about 3, minutes. When three polymers are used, step (i) may include either one polymer or all of one polymer and a portion of a second polymer and step (ii) may include either the remaining two polymers or all of the remaining polymer and the remaining portion of the second polymer. When the remaining two polymers are used in step (ii), the carbon black may be mixed with both such polymers in a single mix or may be mixed, in varying proportions, separately with each of such polymers or with only one of such polymer. Further, natural rubber may not be used as the polymer or parts of the polymers in step (i), such polymers only being selected from the $C_4$ or $C_5$ conjugated diolefin containing synthetic polymers such as polybutadiene, polyisoprene or styrene-butadiene polymers, whereas in step (ii) the polymers which may be used are selected from the $C_4$ or $C_5$ conjugated diolefin containing synthetic polymers and from natural rubber. For example, when styrene-butadiene polymer, polybutadiene and natural rubber are to be used, the styrene-butadiene polymer and/or polybutadiene may be used in step (i) and the styrene-butadiene polymer and/or polybutadiene and natural rubber may be used in step (ii), optionally in two separate mixes each of which contains only one polymer. only one polymer.

Although it appears that the process of this invention may involve more mixing steps than is customary this is actually not the case because the total amount of polymer, carbon black and other compounding ingredients is not changed and the throughput rate of the equipment has not been significantly affected.

The improvements to be found in vulcanizates produced by the process of this invention depend to a certain extent on the particular use to be made of the vulcanizate. In general, the vulcanizates prepared according to the present process may have any one or more of lower heat build-up, lower power loss and associated reduced rolling resistance, lower elongation at break, lower hardness, improved skid resistance, higher rebound and higher resistance to flex crack growth. For tire use, the majority of these property improvements are desired and would be looked for, especially reduce heat build-up and power loss, whereas for mechanical goods use the improvements in hardness and resistance to flex crack growth may only be desired. The compounding recipe used, especially the cure active agents, would be adjusted to obtain the optimal vulcanizate properties for the use desired.

The following examples illustrate the invention and are not intended to limit the scope thereof. All parts are parts by weight and all tests for vulcanizate evaluation are ASTM tests except where otherwise specified.

EXAMPLE 1

These experiments illustrate the results for a composition containing, overall, 100 parts of polymer, 3 parts of naphthenic oil, 5 parts of an octyl-phenolformaldehyde non-heat reactive tackifier (AROFENE ® Resin 8318) and 40 parts of carbon black (N 550), using a single polymer.

The polymer was a free radical emulsion polymerized styrene-butadiene polymer containing about 23 per cent of styrene and having a molecular weight expressed, as the Mooney (ML 1+4 at 100° C.), of about 51. Mixing of the polymer, carbon black and other compounding ingredients including the cure active agents was in an internal mixer (a Banbury ®mixer). For each of the step (i) and (ii) mixing, the mixer was initially at 100° C., the rotor speed was set at 77 rpm and the temperature was allowed to increase during the mixing until at 150° C. the cooling water to the mixer was turned on and the maximum temperature reached was 160° C. The mixing time was 3.25 minutes. After discharge from the mixer, the compound was passed three times through a rubber mill at about 50° C. and was then rested for at least two hours. For the step (b) mixing, the two compounds from steps (i) and (ii) were added to an internal mixer (a Banbury mixer) initially at a temperature of 45° C. with the rotor speed set at 52 rpm and the cure active agents were added. Cooling water was provided to the mixer so that the temperature did not exceed 95° C. The mixing time was 1.25 minutes. After discharge, the compound was banded on a rubber mill at about 50° C., to form sheets of 2 mm thickness, rested and then vulcanized by heating at 150° C. for 40 minutes, as prescribed in ASTM D 3182. The vulcanizates were then tested. The details of the recipes and the vulcanizate properties are given in Table I. Also given in Table I are the vulcanizate properties for a control (Control 1), which is a vulcanizate prepared from the same polymer, oil, black, other compounding ingredients and cure active agents which has been prepared by mixing all of the polymer, oil and black in a single step followed by addition of the cure active agents in a second step. Also included in Table I is a second control (Control 2) in which the mixing procedure was similar to that of the invention but the carbon black was added in equal amounts to each of steps (i) and (ii) (i.e. neither step contained a major proportion of the carbon black). The generally improved power loss (lower value), abrasion resistance (higher value) and DeMattia flex (higher value) can be seen for the vulcanizates prepared according to the process of the invention.

TABLE I

| Experiment # | 1 | 2 | 3 | 4 | 5 | 6 |
|---|---|---|---|---|---|---|
| Control # | | | | | 1 | 2 |
| Step (i) Mixing | | | | | | |
| Polymer | 50 | 50 | 50 | 50 | 100 | 50 |
| Oil | 3 | 3 | — | — | 3 | 3 |
| Carbon Black | 40 | 30 | 30 | 40 | 40 | 20 |
| Tackifier | 2.5 | 2.5 | 2.5 | 2.5 | 5 | 2.5 |
| Zinc Oxide | 2.5 | 2.5 | 2.5 | 2.5 | 5 | 2.5 |
| Stearic Acid | 0.75 | 0.75 | 0.75 | 0.75 | 1.5 | 0.75 |
| Antioxidant[1] | 0.75 | 0.75 | 0.75 | 0.75 | 1.5 | 0.75 |
| Bonding Agent (part one) | 1 | 1 | 1 | 1 | 2 | 1 |
| Step (ii) Mixing | | | | | | |
| Polymer | 50 | 50 | 50 | 50 | — | 50 |
| Oil | — | — | 3 | 3 | — | — |
| Carbon Black | — | 10 | 10 | — | — | 20 |
| Tackifier | 2.5 | 2.5 | 2.5 | 2.5 | — | 2.5 |
| Zinc Oxide | 2.5 | 2.5 | 2.5 | 2.5 | — | 2.5 |
| Stearic Acid | 0.75 | 0.75 | 0.75 | 0.75 | — | 0.75 |
| Antioxidant[1] | 0.75 | 0.75 | 0.75 | 0.75 | — | 0.75 |
| Bonding Agent (part one) | 1 | 1 | 1 | 1 | — | 1 |
| Step (b) Mixing | | | | | | |
| Product from Step (i) | 100.5 | 90.5 | 87.5 | 97.5 | 158 | 80.5 |
| Product from Step (ii) | 57.5 | 67.5 | 70.5 | 60.5 | — | 77.5 |
| Bonding Agent (part two) | 1 | 1 | 1 | 1 | 1 | 1 |
| Sulphur[2] | 3 | 3 | 3 | 3 | 3 | 3 |
| Curative 1[3] | 0.9 | 0.9 | 0.9 | 0.9 | 0.9 | 0.9 |
| Curative 2[4] | 0.2 | 0.2 | 0.2 | 0.2 | 0.2 | 0.2 |

| Experiment # | 1 | 2 | 3 | 4 | 5 | 6 |
|---|---|---|---|---|---|---|
| Vulcanizate Properties | | | | | | |
| Tensile Strength[5] kg/cm$^2$ | 20.3 | 20.3 | 19.8 | 23.2 | 21.3 | 20.1 |
| 100% Modulus[5] kg/cm$^2$ | 2.8 | 2.7 | 2.8 | 3.0 | 3.3 | 2.7 |
| 300% Modulus[5] kg/cm$^2$ | 12.1 | 10.8 | 11.3 | 13.7 | 12.4 | 10.6 |
| Elongation at Break[5] % | 470 | 520 | 490 | 480 | 500 | 520 |
| Hardness[6] Shore C | 66 | 66 | 67 | 66 | 69 | 66 |
| Wet Skid Resistance | 53 | 50 | 53 | 50 | 50 | 53 |
| Rebound[8] % | 61 | 61 | 61 | 61.5 | 60 | 61 |
| Heat Build Up[9] °C. | 21 | 20 | 20.5 | 22 | 24 | 20.5 |
| DeMattia Flex[10] (600% crack growth) kcy | 11 | 12 | 10 | 10 | 6 | 14 |
| Abrasion Resistance[11] % | 47 | 43 | 38 | 51 | 48 | 37 |
| Power Loss[12] | 1.73 | 1.82 | 1.99 | 1.75 | 1.86 | 1.89 |

TABLE I-continued

J/rev.

Notes:
[1] Diphenylamine-acetone reaction product
[2] Dispersion of 20% sulphur in oil
[3] N—cyclohexyl-2-benzothiazole sulphenamide
[4] Diphenylguanidine
[5] ASTM D 412
[6] ASTM D 2240
[7] ASTM E 303 using experimental vulcanizate slider against wet rough asphalt
[8] ASTM D 1054
[9] ASTM D 623 - Method A
[10] ASTM D 813
[11] Akron Abrader - Cabot Test #5
[12] Dunlop rotary power loss

EXAMPLE 2

Following the procedure described in Example 1, using an overall composition the same as in Example 1 except that no naphthenic oil was added, compounds were prepared each based on two different styrene-butadiene polymers. Polymer 1 was the same polymer as that used in Example 1. Polymer 2 was an oil-extended styrene-butadiene polymer, in which the styrene-butadiene polymer contained about 23 weight per cent of styrene and had a high base polymer Mooney value (ML 1+4 at 100° C. of about 115) and contained about 37.5 parts of naphthenic oil per 100 parts of polymer, the oil extended polymer having a Mooney of about 49—reference in Table II to "X" parts of Polymer 2 means polymer plus oil. Table II contains the details of the experiments and the results obtained. The improvement in power loss for the vulcanizates of Experiments #1 and 2 is readily apparent when compared with that of the Control (Experiment #3).

TABLE II

| Example # | 2 | 2 | 2 | 3 |
|---|---|---|---|---|
| Experiment # | 1 | 2 | 3 Control | 1 |
| Step (i) Mixing | | | | |
| Polymer 1 | — | — | 50 | Poly. 3 79.1 |
| Polymer 2 | 50 | 50 | 50 | — |
| Carbon Black | 40 | 30 | 40 | — |
| Tackifier | 2.5 | 2.5 | 5 | 2.5 |
| Zinc Oxide | 2.5 | 2.5 | 5 | 2.5 |
| Stearic Acid | 0.75 | 0.75 | 1.5 | 0.75 |
| Antioxidant | 0.75 | 0.75 | 1.5 | 0.75 |
| Bonding Agent (part one) | 1 | 1 | 2 | 1 |
| Step (ii) Mixing | | | | |
| Polymer 1 | 50 | 50 | — | Poly. 1 50 |
| Carbon Black | — | 10 | — | 10 |
| Tackifier | 2.5 | 2.5 | — | 2.5 |
| Zinc Oxide | 2.5 | 2.5 | — | 2.5 |
| Stearic Acid | 0.75 | 0.75 | — | 0.75 |
| Antioxidant | 0.75 | 0.75 | — | 0.75 |
| Bonding Agent (part one) | 1 | 1 | — | 1 |
| Step (b) Mixing | | | | |
| Product from Step (i) | 97.5 | 87.5 | 155 | 86.6 |
| Product from Step (ii) | 57.5 | 67.5 | — | 67.5 |
| Bonding Agent (part two) | 1 | 1 | 1 | 1 |
| Sulphur | 3 | 3 | 3 | 3 |
| Curative 1 | 0.9 | 0.9 | 0.9 | 0.9 |
| Curative 2 | 0.2 | 0.2 | 0.2 | 0.2 |
| Vulcanizate Properties | | | | |
| Tensile Strength kg/cm$^2$ | 16.8 | 18 | 19.8 | 17.6 |
| 100% Modulus kg/cm$^2$ | 2.7 | 2.5 | 2.7 | 2.5 |
| 300% Modulus kg/cm$^2$ | 11.9 | 10.3 | 10.7 | 10.4 |
| Elongation at Break % | 420 | 480 | 520 | 480 |
| Hardness Shore C | 58 | 58 | 60 | 62 |
| Wet Skid Resistance | 59 | 61 | 57 | — |
| Rebound % | 62 | 60 | 60 | 60 |
| Heat Build Up °C. | 19.5 | 20 | 20 | 19.5 |
| DeMattia Flex kcy (600% crack growth) | 15 | 14 | 15 | — |
| Abrasion Resistance % | 42 | 43 | 40 | 40 |
| Power Loss J/rev | 1.9 | 1.97 | 2.5 | 1.96 |

EXAMPLE 3

Using the styrene-butadiene polymer of Example 1 as Polymer 1 and a commercially available polymer-oil-carbon black masterbatch (100 parts of styrene-butadiene polymer containing about 23 weight per cent of styrene plus 80 parts of N 550 carbon black plus 37.5 parts of naphthenic oil) as Polymer 3, a vulcanizate was prepared according to the process of this invention with the results obtained shown in Table II.

EXAMPLE 4

Two different types of polymers were used in this example. The first polymer, Polymer 1, was the styrene-butadiene polymer of Example 1. The second polymer, Polymer 4, was a solution prepared stereospecific polybutadiene TAKTENE®1203. The details of the recipes used and the results obtained are shown in Table III, together with a control in which the polymers and carbon black were mixed in a single step. The improved tensile strength, 300% modulus, rebound and power loss are readily apparent.

TABLE III

| Experiment # | 1 | 2 | 3 (Control) |
|---|---|---|---|
| Step (i) Mixing | | | |
| Polymer 1 | 50 | — | 50 |
| Polymer 4 | — | 50 | 50 |
| Tackifier | 2.5 | 2.5 | 5 |
| Carbon Black | 40 | 40 | 40 |
| Zinc Oxide | 2.5 | 2.5 | 5 |
| Stearic Acid | 0.75 | 0.75 | 1.5 |
| Antioxidant | 0.75 | 0.75 | 1.5 |
| Bonding Agent (part one) | 1 | 1 | 2 |
| Step (ii) Mixing | | | |
| Polymer 1 | — | 50 | — |
| Polymer 4 | 50 | — | — |
| Tackifier | 2.5 | 2.5 | — |
| Carbon Black | — | — | — |
| Zinc Oxide | 2.5 | 2.5 | — |
| Stearic Acid | 0.75 | 0.75 | — |
| Antioxidant | 0.75 | 0.75 | — |
| Bonding Agent (part two) | 1 | 1 | — |
| Step (b) Mixing | | | |
| Product from Step (i) | 97.5 | 97.5 | 155 |
| Product from Step (ii) | 57.5 | 57.5 | — |
| Bonding Agent (part two) | 1 | 1 | 1 |
| Sulphur | 3 | 3 | 3 |
| Curative 1 | 0.9 | 0.9 | 0.9 |
| Curative 2 | 0.2 | 0.2 | 0.2 |
| Vulcanizate Properties | | | |
| Tensile Strength kg/cm$^2$ | 17.1 | 16.3 | 14.8 |
| 100% Modulus kg/cm$^2$ | 2.4 | 2.5 | 2.5 |
| 300% Modulus kg/cm$^2$ | 10 | 11 | 9.6 |
| Elongation at Break % | 480 | 400 | 440 |
| Hardness Shore C | 63 | 63 | 65 |
| Wet Skid Resistance | 41 | 41 | 40 |
| Rebound % | 72 | 73.5 | 67 |
| Heat Build Up °C. | | | 22 |
| DeMattia Flex kcy (600% crack growth) | 6 | 2 | 3.5 |
| Abrasion Resistance % | 52 | 52 | 46 |
| Power Loss J/rev | 1.34 | 1.31 | 1.47 |

EXAMPLE 5

Three polymers were used in this example. Polymer 1 was the styrene-butadiene polymer of Example 1. Polymer 4 was the polybutadiene of Example 4. Polymer 5 was natural rubber—the actual polymer was one coded as SMR CV and had a Mooney (ML 1+4 at 100° C.) of 68. The three polymers were used such that the vulcanizate always contained 33.3 parts of each of the three polymers and the vulcanizate always contained 40 parts of carbon black for 100 parts of total polymers, which levels were chosen solely to illustrate the invention. Details of the compounds prepared and the vulcanizate properties are given in Table IV. Because the step (ii) mixing was undertaken in two separate mixes, using only one polymer in each mix, the Table identifies this as Step (ii) mixing—A and Step (ii) mixing—B. For the vulcanizates prepared according to the process of the invention, small improvements in tensile strength and 300% modulus and significant improvements in heat build-up and power loss are seen. The vulcanizate properties of the controls show little variation independent of whether the major portion of the carbon black is mixed with natural rubber (Control 1), the carbon black is mixed with each polymer in equal proportions (Control 2) or all the polymers and carbon black are mixed in a single step (Control 3).

TABLE IV

| Experiment # | 1 | 2 | 3 | 4 | Control 1 | Control 2 | Control 3 |
|---|---|---|---|---|---|---|---|
| Step (i) Mixing | | | | | | | |
| Polymer 1 | 33.3 | 33.3 | — | — | — | 33.3 | 33.3 |
| Polymer 4 | — | — | 33.3 | 33.3 | — | — | 33.3 |
| Polymer 5 | — | — | — | — | 33.3 | — | 33.3 |
| Carbon Black | 26.7 | 26.7 | 26.7 | 26.7 | 26.7 | 13.3 | 40 |
| Zinc Oxide | 1.67 | 1.67 | 1.67 | 1.67 | 1.67 | 1.67 | 5 |
| Stearic Acid | 0.5 | 0.5 | 0.5 | 0.5 | 0.5 | 0.5 | 1.5 |
| Tackifier | 1.67 | 1.67 | 1.67 | 1.67 | 1.67 | 1.67 | 5 |
| Antioxidant | 0.5 | 0.5 | 0.5 | 0.5 | 0.5 | 0.5 | 1.5 |
| Bonding Agent (part one) | 0.67 | 0.67 | 0.67 | 0.67 | 0.67 | 0.67 | 2 |
| Step (ii) Mixing - A | | | | | | | |
| Polymer 1 | — | — | 33.3 | — | 33.3 | — | — |
| Polymer 4 | 33.3 | — | — | — | — | 33.3 | — |
| Polymer 5 | — | 33.3 | — | 33.3 | — | — | — |
| Carbon Black | 13.3 | 13.3 | 13.3 | 13.3 | 13.3 | 13.3 | — |
| Zinc Oxide | 1.67 | 1.67 | 1.67 | 1.67 | 1.67 | 1.67 | — |
| Stearic Acid | 0.5 | 0.5 | 0.5 | 0.5 | 0.5 | 0.5 | — |
| Tackifier | 1.67 | 1.67 | 1.67 | 1.67 | 1.67 | — | — |
| Antioxidant | 0.5 | 0.5 | 0.5 | 0.5 | 0.5 | 0.5 | — |
| Bonding Agent (part one) | 0.67 | 0.67 | 0.67 | 0.67 | 0.67 | 0.67 | — |
| Step (ii) Mixing - B | | | | | | | |
| Polymer 1 | — | — | — | 33.3 | — | — | — |
| Polymer 4 | — | 33.3 | — | — | 33.3 | — | — |
| Polymer 5 | 33.3 | — | 33.3 | — | — | 33.3 | — |
| Carbon Black | 0 | 0 | 0 | 0 | 0 | 13.3 | — |
| Zinc Oxide | 1.67 | 1.67 | 1.67 | 1.67 | 1.67 | 1.67 | — |
| Stearic Acid | 0.5 | 0.5 | 0.5 | 0.5 | 0.5 | 0.5 | — |
| Tackifier | 1.67 | 1.67 | 1.67 | 1.67 | 1.67 | 1.67 | — |
| Antioxidant | 0.5 | 0.5 | 0.5 | 0.5 | 0.5 | 0.5 | — |
| Bonding Agent (part one) | 0.67 | 0.67 | 0.67 | 0.67 | 0.67 | 0.67 | — |
| Step (b) Mixing | | | | | | | |
| Product from Step (i) | 65.01 | 65.01 | 65.01 | 65.01 | 65.01 | 65.01 | 154.9 |
| Product from Step (ii)-A | 51.61 | 51.61 | 51.61 | 51.61 | 51.61 | 51.61 | — |
| Product from Step (ii)-B | 38.31 | 38.31 | 38.31 | 38.31 | 38.31 | 38.31 | — |
| Bonding Agent (part two) | 1 | 1 | 1 | 1 | 1 | 1 | 1 |
| Sulphur | 3 | 3 | 3 | 3 | 3 | 3 | 3 |
| Curative 1 | 0.9 | 0.9 | 0.9 | 0.9 | 0.9 | 0.9 | 0.9 |
| Curative 2 | 0.2 | 0.2 | 0.2 | 0.2 | 0.2 | 0.2 | 0.2 |
| Vulcanizate Properties | | | | | | | |
| Tensile strength kg/cm$^2$ | 20.5 | 18.9 | 18.9 | 18.5 | 18.1 | 17.5 | 18.5 |
| 100% Modulus kg/cm$^2$ | 2.8 | 3.0 | 2.9 | 3.1 | 3.0 | 3.0 | 2.9 |
| 300% Modulus kg/cm$^2$ | 12.1 | 12.4 | 12.9 | 13.3 | 12.1 | 11.6 | 11.7 |
| Elongation at Break % | 470 | 440 | 430 | 400 | 430 | 430 | 450 |
| Hardness Shore C | 62 | 63 | 62 | 63 | 63 | 63 | 64 |
| Wet Skid Resistance | 45 | 46 | 47 | 44 | 46 | — | 47 |
| Rebound % | 70 | 68.5 | 69 | 69 | 68.5 | 70 | 68.5 |
| Heat Build Up °C. | 15.5 | 18 | 17.5 | 17 | 18.5 | 19.5 | 17.5 |
| DeMattia Flex kcy (600% crack growth) | 9.5 | 12 | 5.5 | 6 | 6 | — | 19 |
| Power Loss J/rev | 1.24 | 1.31 | 1.20 | 1.27 | 1.39 | 1.36 | 1.38 |

EXAMPLE 6

Polymer 1 of Example 1 and Polymer 5 of Example 5 were used. The results are shown in Table V.

TABLE V

| Experiment # | 1 | Control 1 | Control 2 |
|---|---|---|---|
| Step (i) Mixing | | | |
| Polymer 1 | 50 | — | 50 |
| Polymer 5 | — | 50 | 50 |
| Oil | 2.5 | 2.5 | 5 |
| Carbon Black | 40 | 40 | 40 |
| Tackifier | 2.5 | 2.5 | 5 |
| Zinc Oxide | 2.5 | 2.5 | 5 |
| Stearic Acid | 0.75 | 0.75 | 1.5 |
| Antioxidant | 0.75 | 0.75 | 1.5 |
| Bonding Agent (part one) | 1 | 1 | 2 |
| Step (ii) Mixing | | | |

TABLE V-continued

| Experiment # | 1 | Control 1 | Control 2 |
|---|---|---|---|
| Polymer 1 | — | 50 | — |
| Polymer 5 | 50 | — | — |
| Oil | 2.5 | 2.5 | — |
| Carbon Black | — | — | — |
| Tackifier | 2.5 | 2.5 | — |
| Zinc Oxide | 2.5 | 2.5 | — |
| Stearic Acid | 0.75 | 0.75 | — |
| Antioxidant | 0.75 | 0.75 | — |
| Bonding Agent (part one) | 1 | 1 | — |
| Step (b) Mixing | | | |
| Product from Step (i) | 100 | 100 | 160 |
| Product from Step (ii) | 60 | 60 | — |
| Bonding Agent (part two) | 1 | 1 | — |
| Sulphur | 3 | 3 | 3 |
| Curative 1 | 0.9 | 0.9 | 0.9 |
| Curative 2 | 0.2 | 0.2 | 0.2 |
| Vulcanizate Properties | | | |
| Tensile Strength kg/cm$^2$ | 17.3 | 21.2 | 17.4 |
| 100% Modulus kg/cm$^2$ | 2.9 | 3.3 | 3.4 |
| 300% Modulus kg/cm$^2$ | 14.6 | 15.1 | 14.1 |
| Elongation at Break % | 350 | 420 | 370 |
| Hardness Shore C | 62 | 66 | 65 |
| Wet Skid Resistance | 49.5 | 49.5 | 50 |
| Rebound % | 70 | 68 | 67 |
| Heat Build Up °C. | | | 18 |
| DeMattia Flex kcy (600% crack growth) | 21 | 28 | 18 |
| Abrasion Resistance % | 39 | 34 | 32 |
| Power Loss J/rev | 1.37 | 1.52 | 1.53 |

What is claimed is:

1. A process for producing a vulcanizate having improved properties, said process comprising the steps of:
   (a) mixing in at least two separate steps two or more C$_4$ or C$_5$ conjugated diolefin containing polymers with carbon black and other compounding ingredients except cure active agents, followed by resting of the compounds so produced,
   (b) mixing the compounds from (a) with other compounding ingredients including sulphur and sulphur-containing or peroxidic cure active agents,
   (c) shaping the mixture from (b), and
   (d) vulcanizing the shaped mixture by heating at a temperature of from about 145° C. to about 225° C. for a time of from about 3 to about 60 minutes,
characterized in that in step (a), the polymers are mixed in at least two separate steps wherein:
   (i) about 33 to about 60 weight percent of one or more of the polymers is mixed with from about 60 to 100 weight percent of the carbon black and with other compounding ingredients except cure active agents, said polymers being selected from C$_4$ or C$_5$ conjugated diolefin containing synthetic polymers,
   (ii) about 67 to about 40 weight percent of one or more of the polymers is mixed with from 0 to about 40 weight percent of the carbon black and with other compounding ingredients except cure active agents, said polymers being selected from C$_4$ or C$_5$ conjugated diolefin containing synthetic polymers and natural rubber, such mixing of polymers, carbon black and other compounding ingredients being in a single mix or in separate mixes containing only a single polymer,
   (iii) the compounds from (i) and (ii) are supplied to step (b).

2. The process of claim 1 wherein one of the polymers used in step (i) is a masterbatch comprising 100 parts by weight of styrene-butadiene polymer, 0 to about 100 parts by weight of oil and from about 30 to about 150 parts by weight of carbon black.

3. The process of claim 2 wherein said masterbatch comprises 100 parts by weight of styrene-butadiene polymer, from about 25 to about 50 parts by weight of oil and from about 40 to about 80 parts by weight of carbon black.

4. The process of claim 1 wherein one or two of polybutadiene, natural rubber or styrene-butadiene polymer are used as polymer in step (ii).

5. The process of claim 1 wherein the total carbon black to be used is from about 30 to about 80 parts by weight per 100 parts by weight of polymer.

6. The process of claim 5 wherein two polymers are used, the polymer used in step (i) is one of styrene-butadiene polymer or polybutadiene and the polymer used in step (ii) is one of styrene-butadiene polymer, polybutadiene or natural rubber.

7. The process of claim 5 wherein three polymers are used, the polymer used in step (i) is one of styrene-butadiene polymer or polybutadiene and the polymers used in step (ii) are selected from styrene-butadiene polymer, polybutadiene and natural rubber.

8. The process of claim 7 wherein the polymers used in step (ii) are mixed separately and carbon black is mixed with only one of the polymers.

9. The process of claims 6 or 7 wherein the amount of carbon black to be used is from about 30 to about 50 parts by weight per 100 parts by weight of polymers and from about 75 to 100 weight percent of the carbon black is mixed with polymer in step (i).

10. The process of claims 6 or 7 wherein the amount of carbon black to be used is from about 50 to about 80 parts by weight per 100 parts by weight of polymers and from about 60 to about 75 weight percent of the carbon black is mixed with polymer in step (i).

11. A process for producing a vulcanizate having improved properties, said process comprising the steps of:
   (a) mixing in two separate steps one or two C$_4$ to C$_5$ conjugated diolefin containing polymers with carbon black and other compounding ingredients except cure active agents, followed by resting of the compounds so produced,
   (b) mixing the compounds from (a) with other compounding ingredients, including sulphur and sulphur-containing or peroxidic cure active agents,
   (c) shaping the mixture from (b), and
   (d) vulcanizing the shaped mixture by heating at a temperature of from about 145° to about 225° C. for a time of from about 3 to about 60 minutes,
characterized in that in step (a) the polymer or polymers are mixed in two separate steps wherein:
   (i) about 40 to about 60 weight percent of the polymer or polymers selected from C$_4$ or C$_5$ conjugated diolefin containing synthetic polymers is mixed with from about 60 to 100 weight percent of the carbon black and with other compounding ingredients except cure active agents,
   (ii) about 60 to about 40 weight percent of the polymer or polymers selected from C$_4$ or C$_5$ conjugated diolefin containing synthetic polymers and natural rubber is mixed with from 0 to about 40 weight percent of the carbon black and with other compounding ingredients except cure active agents, and
   (iii) the compounds from (i) and (ii) are supplied to step (b).

12. The process of claim 11 wherein the polymer used in step (i) is selected from styrene-butadiene polymer, polyisoprene or polybutadiene and the polymer used in step (ii) is selected from styrene-butadiene polymer, polyisoprene, polybutadiene or natural rubber.

13. The process of claim 11 wherein the total carbon black to be used is from about 30 to about 80 parts by weight per 100 parts by weight of polymer.

14. The process of claim 11 wherein the polymer used in step (i) is a masterbatch comprising 100 parts by weight of styrene-butadiene polymer, 0 to about 100 parts by weight of oil and from about 30 to about 150 parts by weight of carbon black.

15. The process of claim 14 wherein said masterbatch comprises 100 parts by weight of styrene-butadiene polymer, from about 25 to about 50 parts by weight of oil and from about 40 to about 80 parts by weight of carbon black.

16. The process of claim 14 wherein the polymer used in step (ii) is one of styrene-butadiene polymer, polybutadiene or natural rubber.

* * * * *